March 29, 1927. 1,622,715
J. J. HAWXHURST
LIQUID MEASURING APPARATUS
Filed May 11, 1926
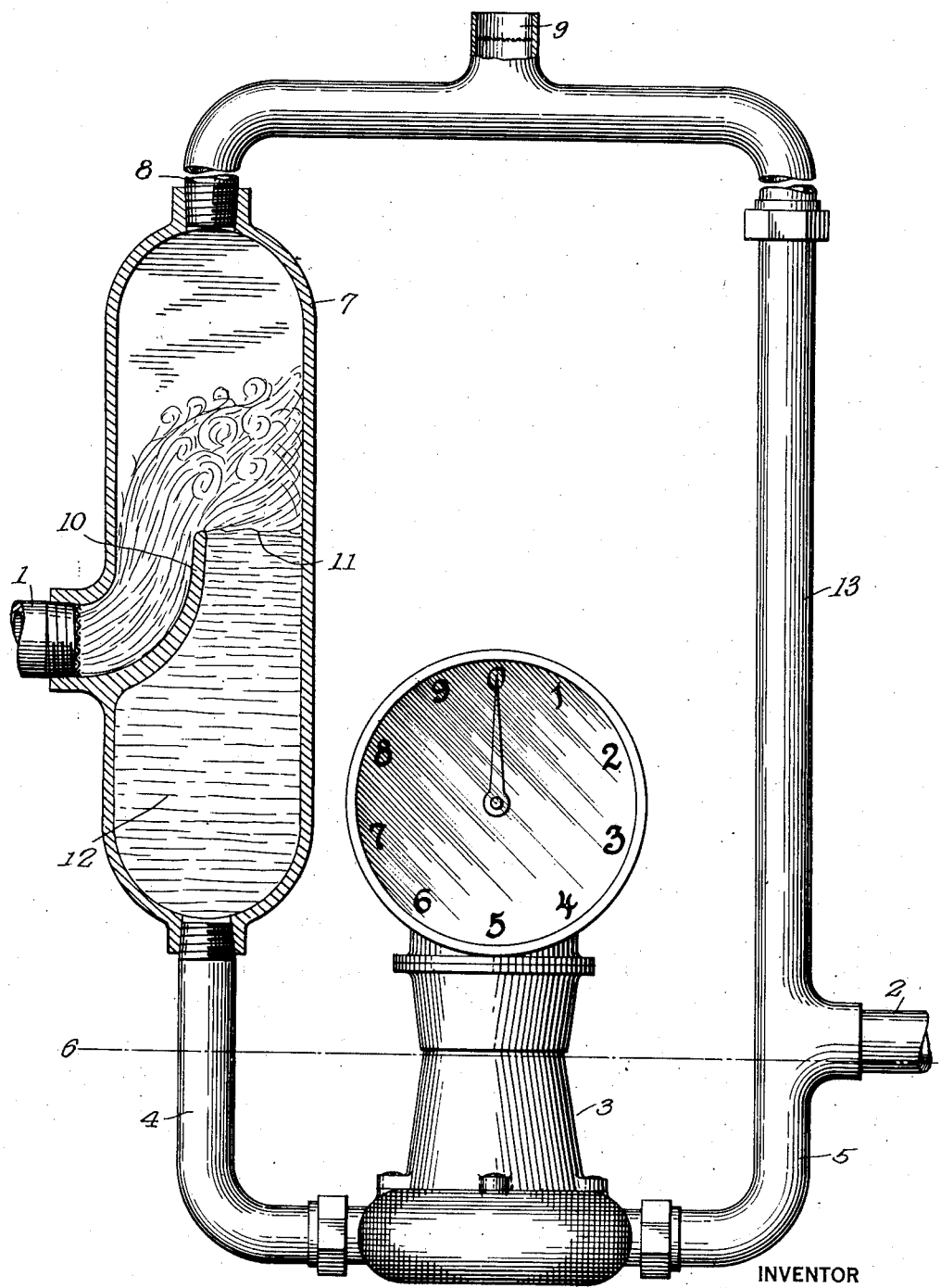
INVENTOR
John J. Hawxhurst
BY
Philip S. McLean
ATTORNEY Patented Mar. 29, 1927.

1,622,715

UNITED STATES PATENT OFFICE.

JOHN J. HAWXHURST, OF BROOKLYN, NEW YORK, ASSIGNOR OF ONE-FOURTH TO M. JAY SAGE, ONE-FOURTH TO FREDERICK W. LANG, BOTH OF BROOKLYN, NEW YORK, AND ONE-FOURTH TO GEORGE W. STEDWELL, OF NEW YORK, N. Y.

LIQUID-MEASURING APPARATUS.

Application filed May 11, 1926. Serial No. 108,242.

The present invention relates particularly to apparatus for measuring liquids of a more or less volatile type such as gasoline. Difficulty has been experienced in metering liquids of this character and various expedients for disposing of entrapped air and handling the liquid to secure a true reading have been proposed without real success, so far as known, to date.

Special objects of the invention are to effect accurate measurement of gasoline or other liquids and to accomplish this with a simple, practical and inexpensive form of device particularly suited to use in combination with the different kinds of apparatus now employed for the delivery and dispensing of such liquids.

These objects are attained in part by a novel combination of surge or settling chamber, air venting connections and liquid seal means by which the air is vented so that only solid liquid passes to the meter and at a proper flow rate for accurate operation of the meter and whereby a liquid seal is provided at both sides of the meter and siphoning of the meter is prevented.

Various other novel features of construction, combinations and relations of parts entering into and included in the invention are described in the following specification and broadly covered in the appended claims.

The drawing accompanying and forming part of this specification illustrates the basic features of the invention by means of a broken part sectional elevation of the apparatus as combined with an ordinary or standard form of meter.

In this view the inlet or supply is provided by a connection shown as ordinary piping 1 and the outlet is indicated as similar piping 2. Such piping may vary with the size, capacity and use of the apparatus and may be in the form of flexible hose or the like, according to different requirements.

A suitable flow meter is indicated at 3 interposed between the inlet and outlet connections, the actuating portion of said meter being shown as connected in the lower portion of a downwardly extending loop formed by piping 4, 5. The outlet is connected with the outlet arm of this loop at the level of the line 6 and the inlet is disposed at a level considerably above this line so that both sides of the loop will remain filled with liquid and provide a trap or liquid seal at both inlet and outlet sides of the meter. The inlet connection discharges into an enlargement which acts as a surge chamber, a de-airing chamber and a well to provide the proper head of solid liquid for accurately operating the meter. This chamber is designated 7 and is shown as a relatively deep chamber having the inlet entered in one side of the same at a point considerably above the bottom at approximately mid-length of the chamber. The inlet arm 4 of the meter sealing loop is entered in the bottom of the chamber and a vent pipe 8 is shown entered in the top of the chamber. This vent pipe is open to atmosphere, as shown at 9 at a point above the level of the liquid source so that air will escape freely without loss of any liquid.

Within the chamber 7 and across or opposite the inlet there is shown an upwardly curved baffle 10 which has the effect of delaying or diverting the incoming rush of liquid and directing it upwardly so that entrained or entrapped air will pass off immediately. This baffle also serves to establish a liquid level in the casing substantially at 11 and to provide a relatively deep well below this level for a body 12 of solid de-aired and substantially non-turbulent liquid. The depth of this well may be substantially in the proportions shown so as to provide a slight head for overcoming the friction and operating the meter at a normal and true registering speed. The meter, therefore, operates under the head of a solid body of liquid rather than under the force of a sudden rush of liquid.

To prevent the outlet 2 from siphoning off the liquid seal, said outlet is provided with a vent 13 which may be combined at the top with the vent 9.

The apparatus is particularly suited for gasoline dispensing stations, tanks, tank wagons and the like and may be connected in service without changing such apparatus.

It will be seen that the first inward surge of liquid into the separating and settling chamber 7 has the effect of driving the air ahead of it upwardly out through the top vent and that the upward flow created by the baffle assists in releasing and throwing off any air entrained in the liquid, allowing the de-aired or solid liquid to drop back in the well where it becomes part of the head flowing to the meter. A part or all of the head will remain if the flow is cut off at the outlet side of the meter and if the flow is cut off at the inlet side, the seal will still be retained so that in either event the meter will be in condition to start with solid liquid the next time of delivery.

Substantially complete de-airing is effected in the surge chamber. The immediate reduction in velocity permitted by the sudden increase in size of the liquid transmitting conduit allows the liquid to expand and lose its velocity. This reduction in velocity, which in the illustration amounts to a drop of about ten to one, gives ample time for practically complete de-airing and maintains a solid head of liquid for operating the meter.

It is usually advisable to strain the liquid before it enters the meter and this is effected in the illustration by providing a screen where the supply pipe enters the surge chamber as clearly shown in the drawing. This strainer may be of a type to automatically remove the water so that there will be no danger of the system freezing up and throwing the apparatus out of order.

What is claimed is:—

1. In liquid measuring apparatus, an enlarged settling and de-airing chamber having a liquid inlet in one side, an air vent in the top and a liquid outlet in the bottom of the same, a liquid meter connected with said outlet and a non-siphoning discharge connection from said meter, the connections from the settling chamber and the outlet from the meter being formed as the arms of an upwardly extending loop for retaining a liquid seal at both sides of the meter, the liquid entrance in the settling chamber being disposed at a level above the level of the discharge outlet from the meter and arranged to enable the fluid entering the same to flow upwardly and to then settle back and form a relatively deep well of solid liquid providing a head for operating the meter.

2. In liquid measuring apparatus, an enlarged settling and de-airing chamber having a liquid inlet and a wall defining a deep settling well separated from the inlet flow of liquid, said chamber having an air vent at the top in communication with both the inlet and the well and provided with a liquid outlet at the bottom leading off from said well, a flow meter connected with said outlet, a non-siphoning discharge connection from said meter, the outlet connection from the well and the outlet from the meter being formed as the arms of an upwardly extending loop for retaining a liquid seal at both sides of the meter, the liquid inlet and the well in the chamber being so related to each other and to the outlet from the meter as to produce a level of liquid in the well higher than said meter outlet to serve as a head for operating the meter.

In witness whereof, I have hereunto set my hand this 21st day of April, 1926.

JOHN J. HAWXHURST.